United States Patent [19]

Shanahan et al.

[11] 4,165,577
[45] Aug. 28, 1979

[54] ELECTRIC BASEBOARD TRAP FOR CRAWLING INSECTS

[75] Inventors: Francis V. Shanahan, Valley Stream; Herman H. Feller, Brooklyn, both of N.Y.

[73] Assignee: Shock-M-All, Inc., Valley Stream, N.Y.

[21] Appl. No.: 745,148

[22] Filed: Nov. 26, 1976

Related U.S. Application Data

[63] Continuation-in-part of Ser. No. 694,742, Jun. 10, 1976, abandoned.

[51] Int. Cl.² .................................................. A01M 1/22
[52] U.S. Cl. .......................................... 43/112; 43/99; 52/287
[58] Field of Search ................ 43/112, 98, 99; 52/242, 52/287, 288

[56] References Cited

U.S. PATENT DOCUMENTS

| | | | |
|---|---|---|---|
| 2,516,264 | 7/1950 | Sheehy | 43/112 |
| 3,077,050 | 2/1963 | Makara | 43/112 |
| 3,366,854 | 1/1968 | Robinson | 43/98 |
| 3,676,974 | 7/1972 | Daly | 52/288 |
| 3,707,061 | 12/1972 | Collette et al. | 52/288 |
| 3,833,046 | 9/1974 | Tombu | 160/395 |

FOREIGN PATENT DOCUMENTS

| | | | |
|---|---|---|---|
| 2448140 | 4/1976 | Fed. Rep. of Germany | 43/112 |
| 432928 | 9/1967 | Switzerland | 43/112 |

Primary Examiner—William Pieprz
Attorney, Agent, or Firm—Alan H. Levine

[57] ABSTRACT

A trap including an elongated base for mounting along the bottom of a wall at the juncture between the wall and floor. A pair of spaced-apart electrical conductors are mounted on the base, and an electrical voltage difference is provided between the conductors. The conductors may be carried by an elongated carrier secured to the base. The carrier may be a stiff strip, or it may be a tape having a pressure sensitive adhesive on one face and two foil strips as the conductors on the other face. The carrier may be gripping means for holding conventional wires, or the conductors, such as foil strips, may be applied directly to the base. The base may be formed with a well for catching dead insects, and the conductors may be in opposed relation above the bottom of the well. An end cap may be provided to finish off one end of the baseboard trap and furnish electric power to the trap. An elongated cover extends along the base and conceals the conductors, the cover being spaced from the floor to provide access for crawling insects to the base and conductors.

21 Claims, 15 Drawing Figures

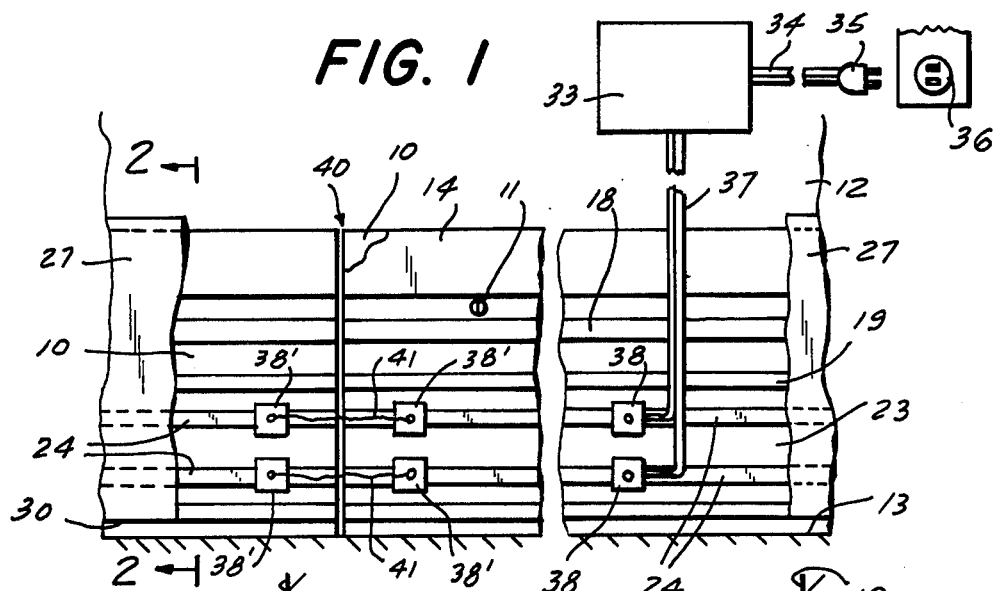
FIG. 1
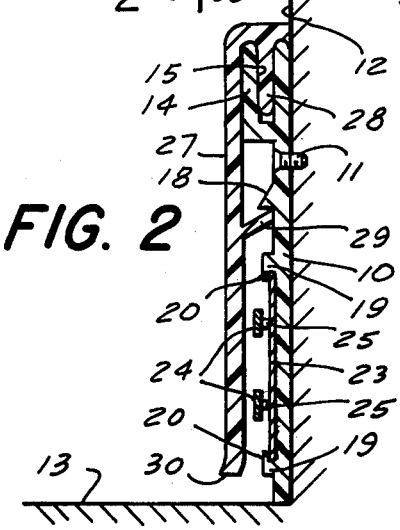
FIG. 2
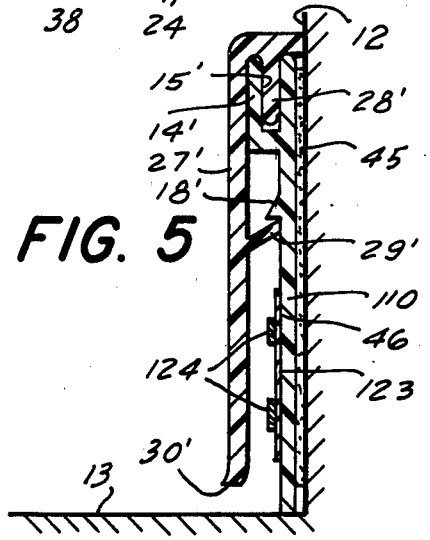
FIG. 5
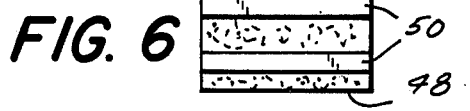
FIG. 3
FIG. 6
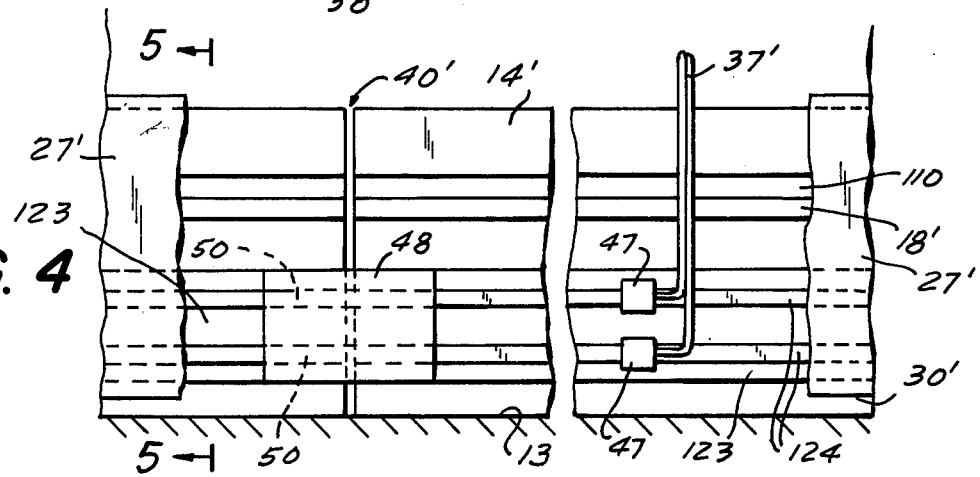
FIG. 4

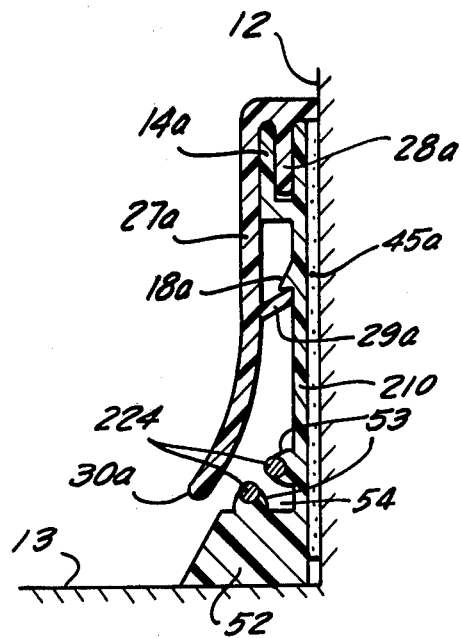
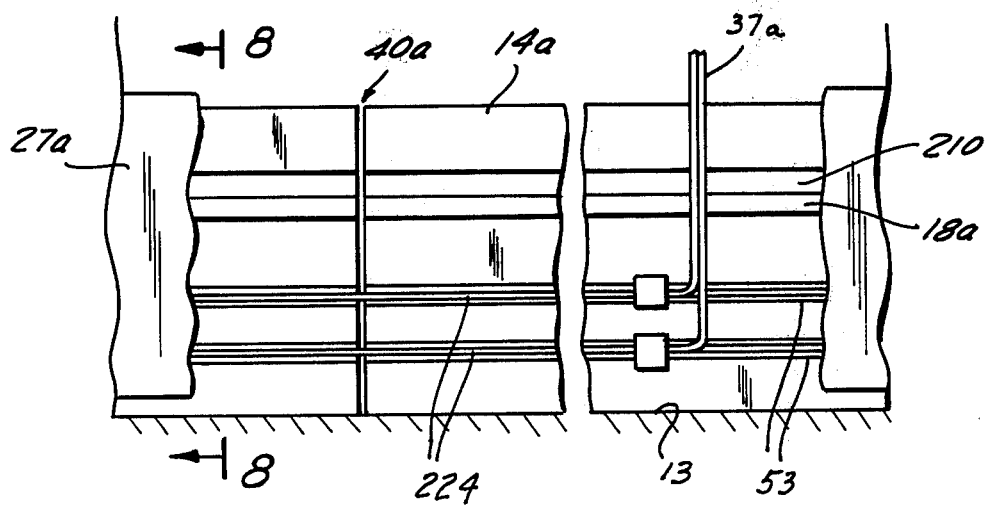

4,165,577

ELECTRIC BASEBOARD TRAP FOR CRAWLING INSECTS

This application is a continuation-in-part of copending application Serial No. 694,742, filed June 10, 1976, and now abandoned.

This invention relates to insect traps, and more particularly to an electrified trap for crawling insects.

For many years, a recurring problem has involved attempts to rid places such as living quarters and commercial establishments of crawling insects. A common way of dealing with the problem of crawling insects is to spread poison at regular intervals around the area to be protected. This is a time-consuming and expensive procedure, and involves a certain degree of risk.

It is an object of the present invention to provide a crawling insect trap which, once installed, operates continuously without care and maintenance.

It is anoher object of the invention to provide an electrified crawling insect trap which makes no use of poisons or other chemicals.

It is a further object of the present invention to provide an electrified crawling insect trap which is completely unobtrusive so that the casual observer will not be aware of its existence.

It is an additional object of the invention to provide an electrified crawling insect trap which has the form of a conventional baseboard, and hence which can either take the place of a conventional baseboard in a room, or which can be mounted directly on an existing baseboard.

It is another object of the invention to provide an electric baseboard trap for crawling insects which includes a removable cover so as to provide easy access to the electrical portion of the trap for cleaning and maintenance purposes.

A further object of the invention is to provide an electric baseboard trap for crawling insects which is inexpensive to manufacture and easy to install with no, or a minimum use of, tools.

It is still another object of the invention to provide an electric baseboard trap for crawling insects formed with a well into which electrocuted insects fall and thereby remain out of sight, and which may easily be cleaned from time-to-time.

It is a further object of the invention to provide an electric baseboard trap for crawling insects furnished with an end cap which neatly finishes off the baseboard and through which electric power is supplied to the trap.

A special feature of the invention involves the use of metal foil bearing adhesive tape as the means for providing the electrical conductors of the trap.

Another special feature of the invention involves the use of gripping means for holding conventional electric wires used as the electrical conductors of the trap.

Additional objects and features of the invention will be apparent from the following description, in which reference is made to the accompanying drawings.

In the drawings:

FIG. 1 is a fragmentary elevational view of an electric baseboard trap for crawling insects according to the present invention;

FIG. 2 is a vertical cross-sectional view taken along line 2—2 of FIG. 1;

FIG. 3 is a perspective view of one of the clamps shown in FIG. 1;

FIG. 4 is a fragmentary elevational view of another embodiment of an electric baseboard trap for crawling insects according to the present invention;

FIG. 5 is a vertical cross-sectional view taken along line 5—5 of FIG. 4;

FIG. 6 is a face view of a connector piece shown in FIG. 4, the face shown in FIG. 6 being the face opposite the one shown in FIG. 4;

FIG. 7 is a fragmentary elevational view of a third embodiment of an electric baseboard trap for crawling insects according to the present invention;

FIG. 8 is a vertical cross-sectional view taken along line 8—8 of FIG. 7;

Figure 10:
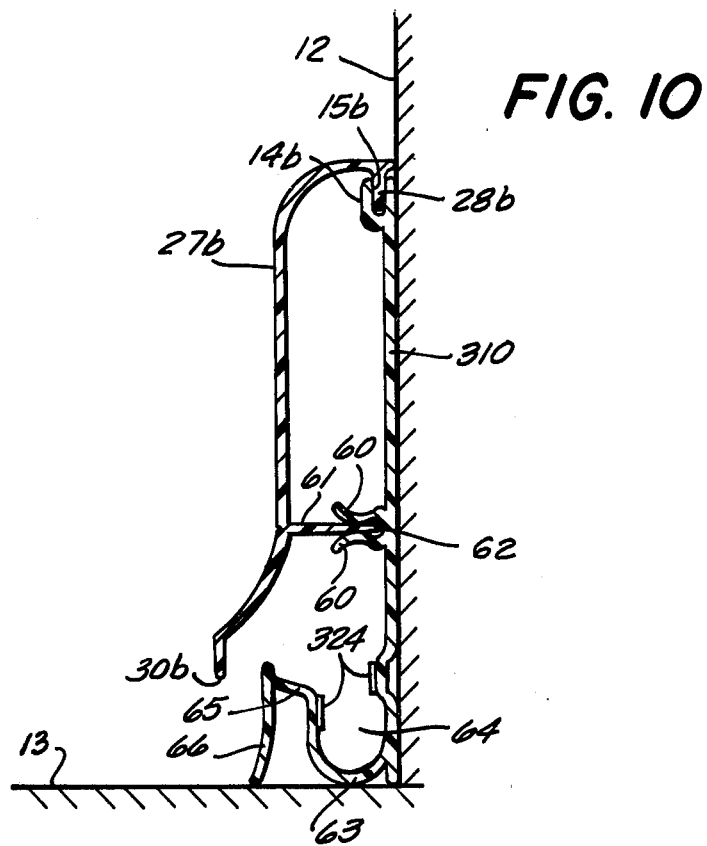
FIG. 10 is a vertical cross-sectional view taken along line 10—10 of FIG. 9.

One embodiment of an electric baseboard trap for crawling insects chosen to illustrate the present invention is shown in FIGS. 1-3. The trap includes a base 10, which may be a metal or plastic extrusion. Base 10 is an elongated flat plate intended to be mounted, such as by screws 11, along the bottom of a wall 12 at the juncture between the wall 12 and floor 13. Wall 12 and floor 13 are, of course, part of the room which is to be rid of crawling insects, such as cockroaches and ants. A projection 14, having an L-shaped cross-section, extends along the entire length of base 10 near the upper edge of the base. Projection 14, together with the upper portion of base 10, defines an upwardly-opening channel 15.

Beneath projection 14, base 10 is formed with a detent 18 extending along the entire length of the base. Detent 18 has a horizontal bottom surface and an inclined upper surface. Beneath detent 18, the front face of base 10 is formed with two vertically spaced-apart holders 19 extending along the entire length of base 10. Upper holder 19 has a downwardly extending flange 20 and lower holder 19 has an upwardly projecting flange 20, both flanges being spaced from the front face of base 10.

An elongated carrier strip 23, of relatively stiff insulator material, extends along the entire length of base 10, and its upper and lower edges are held between flanges 20 and the face of base 10. Two vertically spaced-apart conductor bars 24 are carried by carrier strip 23. Conductor bars 24 are spaced from carrier strip 23 and connected to the strip by a series of pins 25 spaced apart along the lengths of bars 24.

A cover 27, which may be a metal or plastic extrusion, extends along the entire length of base 10. The top wall of cover 27 is formed with a downwardly projecting tongue 28 adapted to fit into channel 15. The rear face of cover 27 is provided with a rearwardly projecting rib 29 which inclines upwardly and rearwardly. As may be seen clearly in FIG. 2, tongue 28 and rib 29 cooperate with channel 15 and detent 18, respectively, to hold cover 27 in place on base 10. In this position, the bottom edge 30 of cover 27 is spaced above floor 13. Cover 27 may readily be removed from base 10 by simply extending the fingers beneath lower edge 30 and pulling the cover outwardly to release the engagement between rib 29 and detent 18. Cover 27 can then be lifted to slide tongue 28 out of channel 15. Replacing cover 27 is just as simple, except that the steps are reversed. The manipulations just described are permitted due to the inherent resiliency of the material from which cover 27 is fabricated.

Conductors 24 are provided with an electric voltage difference preferably by means of a transformer 33. The transformer is provided with an electric cord 34 and plug 35 for insertion into a conventional wall outlet 36. Transformer 33 is provided with another two-wire electric cord 37, the two wires of which are connected to two metal clamps 38 (FIGS. 1 and 3). Each clamp 38 is generally C-shaped, so that it fits around one of the conductor bars 24. The back of each clamp 38 is provided with a set screw 39 for tightening the clamp onto its respective conductor bar 24. Set screw 39 may also serve as the terminal post to which one of the wires of cord 37 is connected.

The voltage difference applied to conductor bars 24 should be of relatively high voltage and very low current. In this way, the voltage difference will be sufficient to kill insects which touch both conductor bars 24, and yet because of the very low current there is no danger in the event that a person or pet happens to touch the conductor bars. In this connection, it may be mentioned that the conductor bars 24 are spaced apart closely enough such that a crawling insect of the type which are to be trapped can easily touch both conductors simultaneously. While the specific voltage and current employed may vary to some extent, an example of the values which can be supplied by transformer 33 are a voltage of about 1800 volts and a current of 0.0065 amperes.

Since base 10 is provided in finite lengths, it happens from time-to-time that two lengths of base 10 are butted end-to-end, as shown in FIG. 1, the line of separation between the two lengths being indicated at 40. In such a case, an electrical connection must be made between the pairs of aligned conductor bars 24. This is accomplished by employing four clamps 38', identical to clamps 38. One of the clamps 38' is secured to each of the four conductor bars 24 to be interconnected, and a conductive wire 41 is used to electrically interconnect each two clamps 38' attached to each pair of aligned conductor bars 24.

If desired, a switch (not shown) which repetitively and automatically turns on and off may be introduced between transformer 33 and plug 35. The switch may be a flasher of the type used in the directional signal circuit of an automobile. Switching the voltage on and off, at for example, fifteen second intervals, has two purposes. First, if the conductors are continuously electrified, an insect which touches the conductors only with its antennae may receive a sensation which will frighten it away without being killed. Periods during which the conductors are not electrified give the insect an opportunity to engage both conductors so that it will be electrocuted when the voltage returns. Second, after the insect has been electrocuted, turning off the power releases the insect and allows it to fall to the floor.

Another embodiment of the present invention is illustrated in FIGS. 4–6. The parts of this embodiment which are identical to the parts shown in FIGS. 1–3 bear the same reference numerals as are used in FIG. 1–3 followed by a prime. There are two differences between the embodiment shown in FIGS. 4–6 and that shown in FIGS. 1–3. First, base 110 is provided on its rear face with a pressure-sensitive adhesive coating 45, and this adhesive coating is used to mount base 110 on wall 12. In this way, base 110 can be mounted without the use of any tools whatsoever. If necessary, a nail or screw may be provided at widely spaced-apart distances along the length of base 10 to insure its attachment to the wall.

The second difference involves the carrier strip which carries the electrical conductors. In FIGS. 4–6, carrier strip 123 is a tape, preferably a thin plastic tape, carrying a pressure-sensitive adhesive coating 46 on one face, strip 123 being secured to base 110 by means of the adhesive 46. Conductors 124 are metal foil strips applied to the face of carrier strip 123 opposite the face which carries adhesive coating 46. If desired, conductors 124 could be two strips of metalized coating applied to the surface of carrier 123.

The ends of the wires comprising electric cord 37' may be secured to conductors 124 by adhesive-bearing tape patches 47.

Where two lengths of base 110 are butted, such as at 40', the electrical interconnection between aligned conductors 124 may be made by means of a connector piece 48 (FIGS. 4 and 6). Connector piece 48 is a short length of tape having both a pressure-sensitive adhesive coating 49 and metal foil conductor strips 50 carried on the same face of the tape. Once the strips 123 of the two lengths are butted at 40', a connector piece 48 is arranged to bridge the line of separation between the lengths of base 110, with the adhesive-bearing face of piece 48 facing carrier strips 123. Connector piece 48 is then pressed against carrier strips 123, with conductor strips 50 engaging the conductors 124.

It will be appreciated that with both embodiments of the present invention, base 10, 110 may be cut to length, after which carrier strip 23, 123, also cut to appropriate length, is assembled with the base. In this way, the trap can be tailored to fit a room of any size.

In use, once the trap has been installed, and electricity applied to the conductors, insects which crawl beneath the lower edge 30, 30' of cover 27, 27' and move on to touch both of the conductors 24, 124 simultaneously will be electrocuted. The trap of the present invention is particularly effective since crawling insects tend to run toward the walls of a room in order to find shelter from the light when a light is turned on in the room. Thus, as the insects attempt to find darkness beneath cover 27, 27', they will be electrocuted.

A further embodiment of the invention is illustrated in FIGS. 7 and 8. The parts of this embodiment which are comparable to the parts shown in FIGS. 1–3 bear the same reference numerals as are used in FIGS. 1–3 followed by an "a". The adhesive 45a is comparable to the adhesive 45 of FIG. 5.

In this embodiment, base 210 is formed with a foot portion 52 projecting forwardly from the bottom portion of the base and extending along the entire length of the base. The upper surface of foot portion 52 and the front surface of base 210 are formed with gripper means 53. The gripper means may be elongated channel-like members, the free edges of which turn in toward each other. If base 210 is a plastic extrusion, grippers 53 can be extruded at the time the base is produced. Alternatively, grippers 53 can be separate members fixed to base 210 and foot portion 52.

The conductors 224 may be conventional electric wires of suitable diameter, which are secured to base 210 and its foot portion 52 simply by snapping each wire into one of the grippers 53. This may be done by snapping a wire into one of the grippers at one point, and then from that point applying a sliding pressure to the wire along its entire length, the pressure serving to progressively press the wire into its respective gripper 53. Thus, no tools whatsoever are required to attach the wires 224 to the base 210.

An advantage of this embodiment is that one of the conductors 224 is arranged on a horizontal surface and the other on a vertical surface, as compared to the embodiments of FIGS. 1-6 wherein both conductors are arranged on a vertical surface. With the embodiment of FIGS. 7-8, an insect will be standing on the conductor 224 mounted on the horizontal surface at the time it touches the other conductor, and hence will certainly be caught. In contrast, with the other embodiments, it is possible for the insect to touch both conductors just with its antennae, and be frightened away. In addition, no separate connector means are needed, since wires 224 can easily bridge the separation 40a between two bases 210.

The region 54 between and beneath the conductors 224 defines a well extending along the entire length of base 210. Insects which become electrocuted after touching both conductors will have a tendency to fall into well 54 and remain out of sight. This is in contrast to the arrangements of FIGS. 2 and 5 in which dead insects fall directly on to the floor 13 and may possibly be seen beneath the level of the lower edge 30, 30' of cover 27, 27'.

Still another embodiment of the invention is illustrated in FIGS. 9-15. In this embodiment, the well for catching electrocuted insects is more defined than in the FIGS. 7 and 8 embodiment. The parts of this embodiment which are comparable to the parts shown in FIGS. 1-3 bear the same reference numerals as are used in FIGS. 1-3 followed by a "b".

Figure 9:
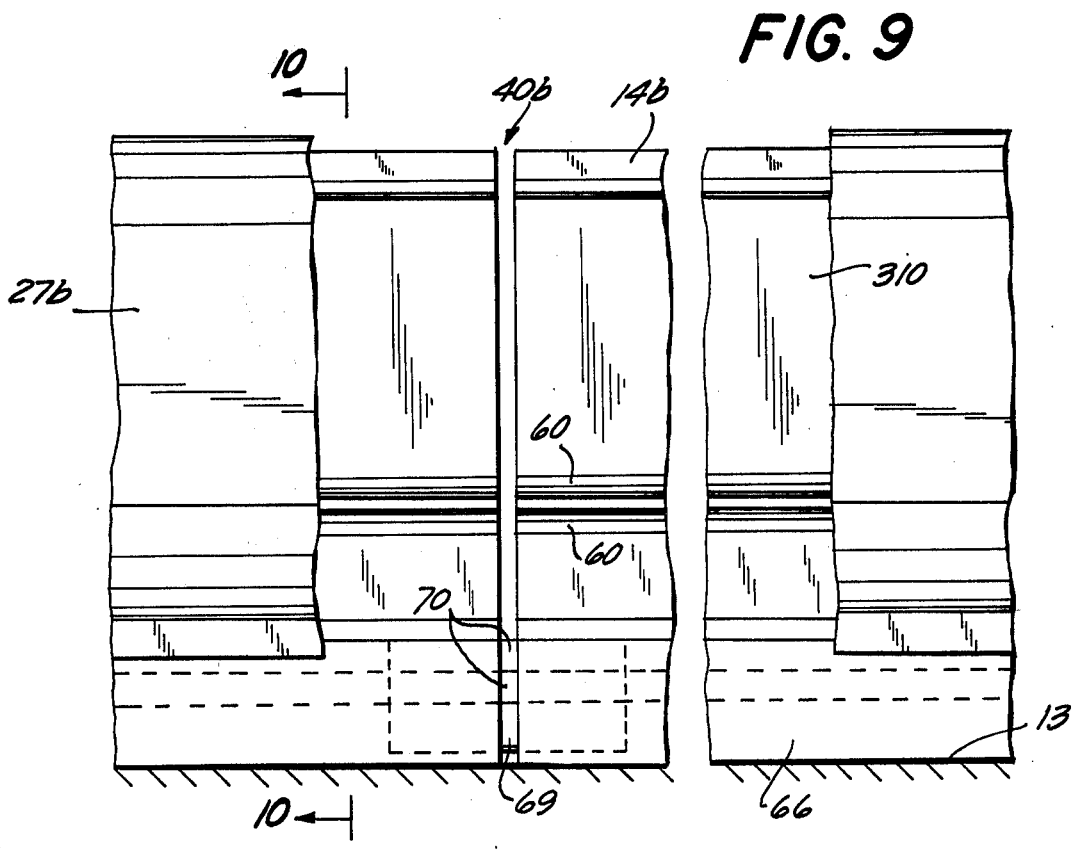
FIG. 9 is a frgmentary elevational view of a fourth embodiment of an electric baseboard trap for crawling insects according to the present invention.

Referring to FIGS. 9 and 10, base 310 may be secured to wall 12 by any suitable fastening means, such as adhesive or screws. Projecting forwardly from base 310 are a pair of yieldable arms 60, which arch toward each other, and extend along the entire length of base 310. Projecting inwardly from the rear face of cover 27b is a plate 61, extending for the entire length of the cover, and having a slight enlargement 62 along its free inner edge. When cover 27b is being placed on base 310, tongue 28b is placed in channel 15b and the cover is then swung in a counterclockwise direction, in FIG. 10, to push plate 61 between arms 60. Enlargement 62 causes arms 60 to spread apart slightly as it moves between them, and when the parts reach the position shown in FIG. 10, the arms reclose behind the enlargement to maintain the cover in place. To remove the cover, the manipulations just described are reversed.

Figure 11:
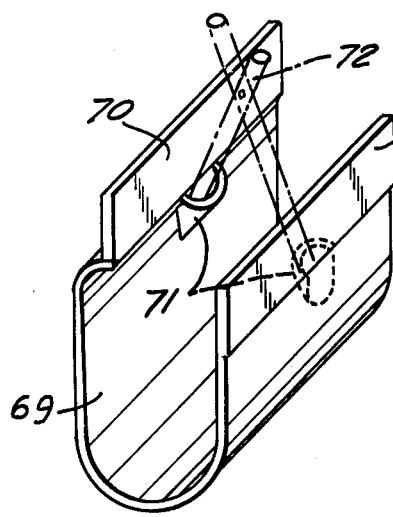
FIG. 11 is a perspective view of a connector for electrically connecting the butted ends of two baseboards shown in FIG. 9.
Figure 12:
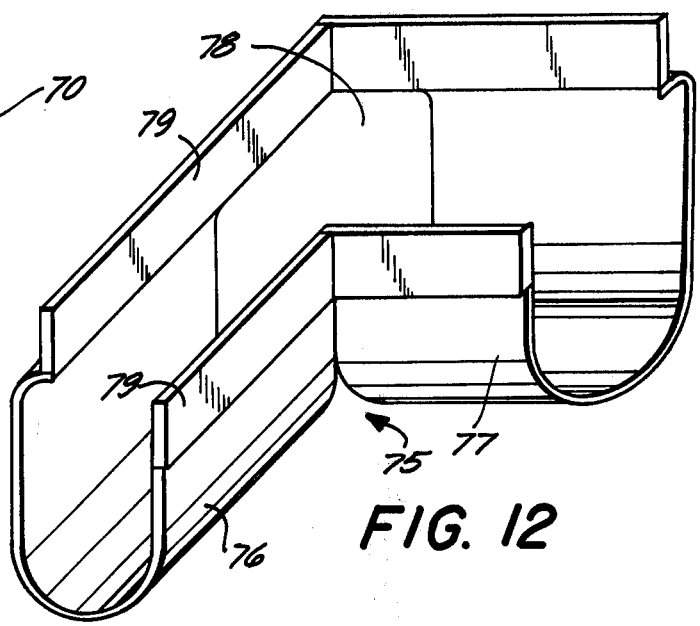
FIG. 12 is a perspective view of a connector for electrically connecting the ends of two baseboards which meet at a corner.

Along its lower edge, base 310 is formed with a U-shaped portion 63 defining a well 64 extending along the entire length of base 310. Portion 63 merges into an inclined wall 65 which terminates in a front panel 66. The opposed surfaces of U-shaped portion 63 carry conductors 324, both conductors being above the level of the bottom of well 64. The conductors may be foil strips adhered to base 310 or a metalized coating applied to the base.

Where two lengths of base 310 are butted, such as at 40b, the electrical interconnection between aligned conductors 324 may be made by means of a connector 69 (FIGS. 9 and 11). The connector is a resilient, non-conductive, U-shaped member, which may be made of plastic, the upper margins 70 of which are metallized along their outer surfaces, or preferably along their inner and outer surfaces. Just beneath the metallized margins 70, the inner wall of each arm of the U-shaped connector is formed with a pocket 71. Each pocket is adapted to accommodate the end of a suitable tool, such as the end of one of the arms of a pair of needle nose pliers 72. Thus, when two lengths of base 310 are brought into aligned butting relationship, pockets 71 of a connector 69 are engaged by the ends of pliers 72 and the margins 70 squeezed toward each other. In this condition, connector 69 is inserted into the wells 64 of the butted bases with the connector bridging the line of separation between the lengths of base 310. The pliers are then removed and the margins 70 of connector 69 move away from each other, due to the inherent resilience of connector 69, so that each of the margins 70 seats tightly against one of the conductors 324 of each length of base. Each margin 70 thereby electrically interconnects two aligned conductors 324 of the two butted lengths of base 310. Although the connector has been described as used with a pair of pliers, it may be manipulated in other ways, even by hand. Furthermore, pockets 71 are not essential, since the connector may be gripped by the margins 70 and squeezed together.

Where two lengths of base 310 meet at a corner of the room, each base and its cover 27b are cut at a 45° angle, or some other suitable angle, to permit butting of the ends of the lengths of base and their covers. In such a case, electrical interconnection of the conductors 324 of the two lengths of base is achieved by means of the angle connector 75 shown in FIG. 12. The two legs 76 and 77 of the angle connector meet at a 90° angle. However, the outside corner region of the connector is provided with a cutout 78 to permit flexing of the connector to increase or decrease the angle between legs 76 and 77 for any particular installation in case the walls of a particular room meet at an angle other than 90°. The upper margins 79 of connector 75 are metallized, so that connector 75 functions in substantially the same way as connector 69 of FIG. 11.

Figure 13:
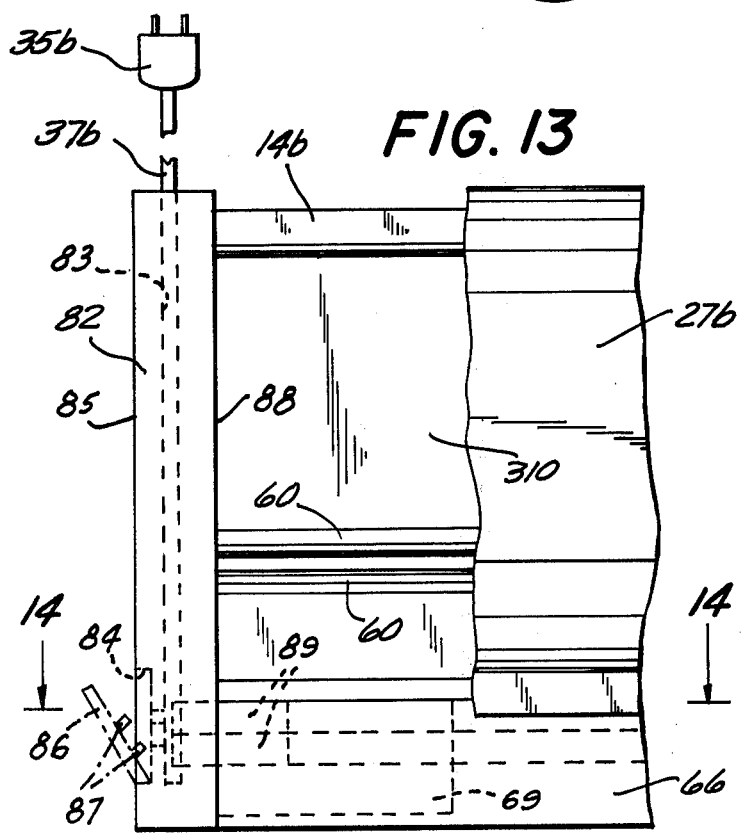
FIG. 13 is a fragmentary elevational view of an electric baseboard trap of the type shown in FIGS. 9 and 10 provided with an end cap through which the trap is supplied with electric power.
Figure 14:
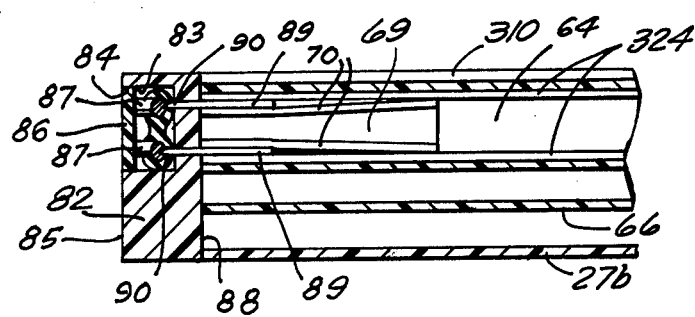
FIG. 14 is a horizontal cross-sectional view taken along line 14—14 of FIG. 13.
Figure 15:
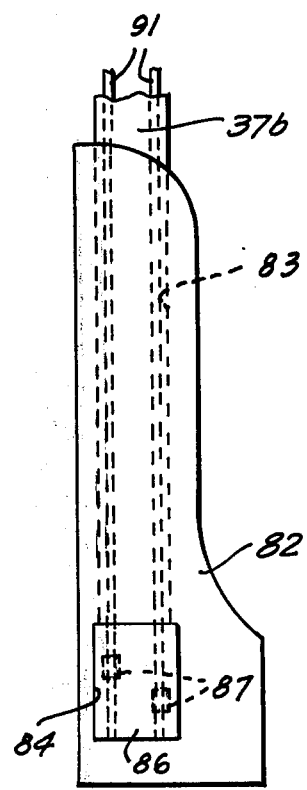
FIG. 15 is an end elevational view of the end cap.

In order to give one end of a length of base 310 and its cover 27b a finished appearance, and to furnish the conductors 324 with electric power, an end cap 82 illustrated in FIGS. 13-15 is employed. The end cap may be a substantially solid piece of plastic profiled, as shown in FIG. 15, to correspond to the cross-sectional profile of base 310 and cover 27b (see FIG. 10) so that it can completely close off the end of a length of base 310 and its cover 27b. End cap 82 is formed with an internal vertical slot 83 extending from the top edge of the end cap to a point just above the bottom of the end cap. In the region of the bottom of slot 83, a rectangular opening 84 extends from the slot to the external face 85 of the end cap. Within opening 84 is a door 86 hinged along its lower edge to the lower edge of opening 84. The inner face of door 86 carries two projections 87 which extend into slot 83 when the door is closed.

Projecting from the inner face 88 of end cap 82 are two electrical contact blades 89 each of which is on the same level as one of the conductors 324. Each blade extends into end cap 82 and terminates within the lower region of slot 83 in a sharp pointed edge 90. Each of the pointed edges is aligned with one of the projections 87 carried by door 86.

To make the electrical connection to a source of power, a length of electric cord 37b is employed, including two conductors 91 and the usual plug 35b at one end. The end of cord 37b opposite the plug is inserted into slot 83 in the end cap until the end of the cord reaches the bottom of the slot. Door 86 is open during this procedure so that the bottom of the slot can be viewed. The door is then closed, and projections 87 push cord 37b toward contacts 89 to cause the sharp pointed edges 90 to pierce the insulation of cord 37b and engage the conductors 91, respectively. In this way, an electrical connection is made between contacts 89 and power cord 37b, so that when plug 35b is inserted into a conventional electrical receptacle, power is present at contacts 89.

When end cap 82 is brought against the end of base 310, contacts 89 engage conductors 324, respectively. To insure good contact pressure between each pair of contact 89 and conductor 324, a connector 69 (FIG. 11) is placed into well 64 so that its margins 70 press outwardly against contacts 89.

When an insect crawls beneath the lower edge 30b of cover 27b, up front panel 66, and into engagement with conductors 324, it is electrocuted and falls into well 64. The dead insects lying in the well are hidden from view, so that the trap always has a neat appearance. Periodically, cover 27b may be removed and the dead insects brushed out or otherwise removed from well 64. If desired, end cap 82 can be removed to open the end of well 64 so that the insects can be brushed out, after which the end cap is replaced.

If desired, an appropriate scent can be applied to the conductors 24, 124, 224, 324 or the region of the base 10, 110, 210, 310 directly adjacent to the conductors, which will attract roaches, or other crawling pests, to the conductors. Such scents are available commercially, and one chemical which has this characteristic is 2, 2-dimethyl-3-isopropylide-necycyclopropyl.

The invention has been shown and described in preferred form only, and by way of example, and many variations may be made in the invention which will still be comprised within its spirit. It is understood, threfore, that the invention is not limited to any specific form or embodiment except insofar as such limitations are included in the appended claims.

What is claimed is:

1. An electric baseboard trap for crawling insects, comprising:
    (a) a flat elongated base,
    (b) means for securing said base along the bottom of a wall at the juncture between the wall and floor of a room,
    (c) a pair of spaced-apart electrical conductors mounted on said base, said conductors being spaced apart a distance small enough such that a crawling insect can touch both conductors simultaneously,
    (d) means for providing an electrical voltage difference between said conductors,
    (e) an elongated cover extending along but spaced from said base, said cover concealing said conductors, and the lower edge of said cover being spaced from the room floor to provide access for crawling insects to said base and conductors,
    (f) means defining a well at the bottom of said base extending along the entire length of said base, said electrical conductors being above the bottom of said well and on opposite sides of said well, so that after an insect touches both of said conductors it can fall between them into said well, and
    (g) a connector for electrically connecting the ends of said conductors to the ends of a similar pair of conductors when the ends of two bases are butted, said connector comprising a nonconductive resilient member having a pair of arms flexible toward and away from each other, each arm having a conductive portion and said connector fitting snugly within the wells of said bases and bridging the line of separation between the bases, each of said conductive portions engaging one of said conductors of each base.

2. An electric baseboard trap as defined in claim 1 including an elongated carrier secured to said base, said electrical conductors being carried by said carrier.

3. An electric baseboard trap as defined in claim 2 wherein said carrier is a relatively stiff strip, and said base includes integral mounting means for securing said strip to said base.

4. An electric baseboard trap as defined in claim 2 including connector means for electrically connecting the ends of each of said conductors to the ends of a similar pair of conductors when two of said carriers are arranged end-to-end.

5. An electric baseboard trap as defined in claim 2 wherein said carrier includes gripper means, and said conductors are electric wires frictionally held in said gripper means.

6. An electric baseboard trap as defined in claim 1 including a pair of pockets on the interior surface of each connector arm for engagement by a tool.

7. An electric baseboard trap as defined in claim 1 wherein said connector is U-shaped.

8. An electric baseboard trap as defined in claim 1 wherein only the upper margins of said connector arms carry conductive material.

9. An electric baseboard trap as defined in claim 1 wherein said connector has an angle shape, each leg of the angle having a pair of arms.

10. An electric baseboard trap as defined in claim 9 wherein the external corner of said angle is cut away to permit flexing of the two legs of the angle toward and away from each other.

11. An electric baseboard trap for crawling insects, comprisng:
    (a) a flat elongated base,
    (b) means for securing said base along the bottom of a wall at the juncture between the wall and floor of a room,
    (c) an elongated tape having a pressure sensitive adhesive coating on one face, said tape being secured to said base by means of said adhesive coating,
    (d) a pair of spaced apart electrical conductors in the form of foil strips exposed on the face of said tape opposite the free coated with adhesive, said conductors being spaced apart a distance small enough such that a crawling insect can touch both conductors simultaneously,
    (e) a connector piece for electrically connecting the ends of said foil strips to the ends of a similar pair of foil strips when the ends of two tapes are aligned, said connector piece comprising a piece of tape carrying two foil strips and a pressure sensitive adhesive all on the same face, said connector piece bridging the ends of said tapes and being secured to said tapes by said adhesive, each of said foil strips of the connector piece bridging the ends of two aligned foil strips carried by said tapes, (f) means for providing an electrical voltage difference between said conductors, and (g) an elongated cover extending along but spaced from said base, said cover concealing said conductors, and the lower edge of said cover being spaced from the room floor to provide access for crawling insects to said base and conductors.

12. An electric baseboard trap as defined in claim 11 including means for removably securing said cover to said base.

13. An electric baseboard trap as defined in claim 11 including scent means for attracting crawling insects to the region of said conductors.

14. An electric baseboard trap for crawling insects, comprising:

(a) a flat elongated base, (b) means for securing said base along the bottom of a wall at the juncture between the wall and floor of a room, (c) a pair of spaced-apart electrical conductors mounted on said base, said conductors being spaced apart a distance small enough such that a crawling insect can touch both conductors simultaneously, (d) means for providing an electrical voltage difference between said conductors, (e) an elongated cover extending along but spaced from said base, said cover concealing said conductors, and the lower edge of said cover being spaced from the room floor to provide access for crawling insects to said base and conductors, and (f) an end cap for placement against the end of said base, and wherein said means (d) includes a pair of contacts projecting from said end cap, each contact engaging one of said conductors.

15. An electric baseboard trap as defined in claim 14 wherein said means for securing said base to said wall includes a pressure-sensitive adhesive carried by the back face of said base.

16. An electric baseboard trap as defined in claim 14 including a foot portion projecting forwardly from the lower part of said base, said foot portion having an upper surface forming a dihedral angle with the front surface of said base, and one of said conductors being mounted on each of said surfaces.

17. An electric baseboard trap as defined in claim 14 including means defining a well at the bottom of said base extending along the entire length of said base, said electrical conductors being above the bottom of said well and on opposite sides of said well, so that after an insect touches both of said conductors it can fall between them into said well.

18. An electric baseboard trap as defined in claim 17 wherein said well-defining means includes a U-shaped portion extending forwardly from said base, said conductors being carried by the opposed surfaces of the U-shaped portion.

19. An electric baseboard trap as defined in claim 14 including a slot in said end cap, an electrical cord extending into said slot, and means within said end cap for electrically connecting said cord to said contacts.

20. An electric baseboard trap as defined in claim 19 including a pair of pointed edges within said slot, said edges being electrically connected to said contacts, respectively, and means carried by said end cap for pushing said electrical cord against said knife edges.

21. An electric baseboard trap as defined in claim 20 wherein said pushing means includes a door fitted within an opening in said end cap, said opening communicating with said slot.

* * * * *